United States Patent Office 3,420,803
Patented Jan. 7, 1969

3,420,803
LITHIUM AMIDE AS A TRANSESTERIFICATION CATALYST
John A. Price, Swarthmore, and Otto K. Carlson, Marcus Hook, Pa., assignors to FMC Corporation, Philadelphia, Pa., a corporation of Delaware
No Drawing. Filed Nov. 23, 1966, Ser. No. 596,452
U.S. Cl. 260—75                                   2 Claims
Int. Cl. C08g 17/08; C08g 17/013

ABSTRACT OF THE DISCLOSURE

Process for the preparation of polyethylene terephthalate comprising carrying out a transesterification reaction between dimethyl terephthalate and ethylene glycol in the presence of lithium amide and polycondensing the resulting the resulting product.

---

This invention relates to a method of preparing filament-forming linear polyesters. More particularly, it relates to an improved method for preparing filament-forming polyethylene terephthalate resin through the use of transesterification catalysts.

The manufacture of filament-forming polyester resin from a dialyl terephthalate and glycol is well-known in the art. Generally, in the preparation of such polyesters, a dialkyl terephthalate and glycol are first combined and subjected to an ester-interchange reaction or transesterification in the presence of a transesterification catalyst at elevated temperature and atmospheric pressure. The resulting product or prepolymer is then polycondensed at higher temperatures and under reduced pressure in the presence of a polycondensation catalyst to form the desired filament-forming polyester resin.

Many catalysts have been suggested heretofore for use in the present transesterification step. However, generally, none of these have proved entirely satisfactory since many of those known, for instance, are not capable of producing linear polyester polymers having a sufficiently high molecular weight and low carboxyl content within a relatively short reaction period. A polyethylene terephthalate resin suitable for melt spinning into filaments should have a carboxyl value of about or below 50 equivalents per million grams (eq./$10^6$ gr. or meq./kg.), an intrinsic viscosity of not less than about 0.60 (as determined in a 60% phenol and 40% tetrachloroethane solution, wt./wt., at 30° C.), and a birefringent melting point of at least about 258° to about 260° C.

From a commercial standpoint, it is essential that the polyester resin be produced in the shortest possible time and that the desired degree of polymerization be obtained. One way of evaluating the effectiveness of a transesterification catalyst is by measuring the "half-time" of the catalyst. The "half-time" is defined as the time required for the first one-half of the theoretical amount of methyl alcohol that will be produced during the transesterification reaction to distill from the reaction mixture. It is desirable that the half-time be as short as possible; however, it is essential that the transesterification catalyst acts to bring about the formation of a suiable polyeser prepolymer for polycondensaion into a highly polymeric polyester.

It is an object of this invention to prepare polyethylene terephthalate resin suitable for melt extrusion into non-degrade, processable filaments by a transesterification and polycondensation process.

Another object of the present invention is to provide an improved method for accelerating the ester-interchange between ethylene glycol and dimethyl terephthalate.

These and other objects are accomplished in accordance with the present invention which involves a method of preparing filament-forming polyethylene terephthalate wherein dimethyl terephthalate and ethylene glycol are transesterified and the resulting transesterified product is polycondensed in the presence of a condensation catalyst, the improvement comprising carrying out said transesterification reaction in the presence of a catalytic amount of lithium amide.

Generally, concentrations of the present transesterification catalyst in the range of from about 0.01% to about 0.20%, based on the weight of dimethyl terephthalate in the subject dimethyl terephthalate-ethylene glycol reaction mixture, is used. Usually, it has been found that from about 0.02% to about 0.1% of lithium amide, based on the weight of dimethyl terephthalate in the reaction mixture, is preferred to produce the linear polyester resins of the present method. Higher or lower concentrations of the present catalyst can also be used. However, when concentrations less than the above are used, their catalytic effect is generally reduced whereas if greater concentrations than this are use, no further improvement in the present method or desired product is obtained.

In general, the preparation of filament-forming polyesters of the present invention via the ester-interchange reaction is carried out with a molar ratio of ethylene glycol to dimethyl terephthalate of from about 1:1 to about 15:1, but preferably from about 1.2:1 to about 2.6:1. The ester-interchange reaction is generally carried out at atmospheric pressure in an inert atmosphere, such as nitrogen, initially at a temperature range of from about 125° C. to about 250° C., but preferably between about 150° C. and 200° C. in the presence of an ester-interchange catalyst. During this first stage, methyl alcohol is evolved and is continually removed by distillation. After a reaction period of about one hour, the temperature of the reaction mixture is raised from 200° C. to about 300° C. for approximately 3 to 5 hours in order to complete the reaction and distill off excess glycol which has been produced and induce polycondensation. The main product of the ester-interchange reaction is comprised principally of bis(2-hydroxyethyl) terephthalate. The second stage or polycondensation step of the present method is generally achieved under reduced pressure within the range of from about 225° C. to about 325° C. for about 3–5 hours.

The polycondensation step of the preesnt method is generally accomplished through the addition of a suitable catalyst, for example, antimony trioxide and the like. The polycondensation catalyst may be added to the present reaction mixture before initiating the ester-interchange reaction between the ethylene glycol and dimethyl terephthalate or after the product thereof is formed. The polycondensation catalysts are generally employed in amounts ranging from about 0.005 to about 0.5%, based on the total weight of reactions.

The following example of a preferred embodiment of the present invention will further serve to illustrate the present invention. All parts are by weight, unless otherwise indicated.

Example

A mixture comprising 600 grams of dimethyl terephthalate, 396 mls. of ethylene glycol, and 0.24 grams of lithium amide ($LiNH_2$) was charged into a reaction vessel equipped with a nitrogen inlet, a distillation arm, heating means, and stirring means. The reaction mixture was agitated and heated at atmospheric pressure to about 197° C. over a period of about 30 minutes under a nitrogen blanket whereby by-product methyl alcohol was distilled off. The reaction mixture was held at 197° C. for about 2 hours. Then, the temperature of the reaction mixture was allowed to rise in order to distill off any remaining by-product, comprising methyl alcohol and excess ethylene glycol, and form the desired polyester prepolymer product. After about 30 minutes, the temperature had risen to 230° C., at which time the prepolymer formed was cooled under an atmosphere of nitrogen.

The prepolymer produced had a carboxyl content value of 1.0 (meq./kg.). The "half-time" of the lithium amide transesterification catalyst was 14 minutes.

50 grams of the above prepolymer was combined with 0.02 grams of antimony trioxide in a reaction vessel equipped with a nitrogen inlet, a vacuum source, a distillation arm, stirring means, and heating means. The pressure within the reaction vessel was reduced to about 0.1 mm. of mercury at 285° C. under a nitrogen blanket and the reaction mixture was maintained under these conditions for about three hours under agitation, to bring about the polycondensation of the prepolymer and formation of the polyester resin.

The resulting polyester product had an intrinsic viscosity of 0.82 (determined in a 60% phenol and 40% tetrachloroethane solution, wt./wt., at 30° C.), a melting point of about 263° C. and a carboxyl content value of 12.7.

The results in the above example indicate that the presence of lithium amide during the transesterification step of the present method, in general, facilitates the preparation of the polyester prepolymer and in turn the resulting polyester product. Through the use of the subject transesterification catalyst, the transesterification reaction of the present method is accelerated and a transesterified product is obtained which is suitable for condensing into a highly polymeric polyester. The polyester product of the present method possesses a high molecular weight as indicated by its intrinsic viscosity, a desirably high melting point, and a low carboxyl content.

It will be apparent that many various different embodiments of this invention may be made practicing this invention without departing from the spirit and scope thereof, and therefore, it is not intended to be limited except as indicated in the appended claims.

We claim:
1. In a process for the preparation of a filament-forming polyethylene terephthalate resin wherein dimethyl terephthalate and ethylene glycol are transesterified and the resulting transesterified product is polycondensed in the presence of a condensation catalyst, the improvement comprising carrying out the transesterification reaction in the presence of a catalytic amount of lithium amide as a transesterification catalyst.

2. The process of claim 1 wherein the lithium amide is present in an amount of from about 0.01% to about 0.20%, based on the weight of dimethyl terephthalate in the reaction mixture.

References Cited
UNITED STATES PATENTS 3,028,350    4/1962    Hirsch _____ 260—75 XR WILLIAM H. SHORT, *Primary Examiner.*

L. P. QUAST, *Assistant Examiner.*

U.S. Cl. X.R.

260—475

UNITED STATES PATENT OFFICE
CERTIFICATE OF CORRECTION

Patent No. 3,420,803  January 7, 1969

John A. Price et al.

It is certified that error appears in the above identified patent and that said Letters Patent are hereby corrected as shown below:

Column 1, line 17, cancel "the resulting"; line 26, "dialyl" should read -- dialkyl --; line 61, "suiable polyeser" should read -- suitable polyester --; line 62, "polycondensaion" should read -- polycondensation --; line 65, "degrade" should read -- degraded --. Column 2, line 45, "preesnt" should read -- present --; line 54, "reactions" should read -- reactants --.

Signed and sealed this 17th day of March 1970.

(SEAL)
Attest:

Edward M. Fletcher, Jr.

Attesting Officer

WILLIAM E. SCHUYLER, JR.

Commissioner of Patents